(12) United States Patent
Goff et al.

(10) Patent No.: US 6,356,400 B1
(45) Date of Patent: Mar. 12, 2002

(54) EYEWEAR MAGNIFYING LOUPE

(75) Inventors: James A. Goff, Webster; Richard J. Stryker, Scottsville; Paul Eric Carlson, Skaneateles; Deborah A. Laun, Syracuse, all of NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/650,300

(22) Filed: Aug. 28, 2000

(51) Int. Cl.[7] .......................... G02B 27/02; G02B 7/02; G02C 5/22
(52) U.S. Cl. .................. 359/802; 359/818; 351/158
(58) Field of Search .................... 359/802, 803, 359/808, 805, 809, 818; 351/158; 248/902, 309.2

(56) References Cited

U.S. PATENT DOCUMENTS

| | | | |
|---|---|---|---|
| 2,796,803 A | * 6/1957 | Stegman | 359/819 |
| 4,196,966 A | 4/1980 | Malis | 359/482 |
| 4,349,246 A | 9/1982 | Binner | 359/597 |
| 4,429,959 A | 2/1984 | Walters | 351/158 |
| D286,395 S | 10/1986 | Greenlaw et al. | D12/189 |
| 4,647,165 A | 3/1987 | Lewis | 351/59 |
| 4,676,609 A | 6/1987 | Matsui | 351/118 |
| 4,733,958 A | 3/1988 | Gorsich | 351/158 |
| 4,798,454 A | 1/1989 | Hyun | 351/50 |
| 4,896,956 A | 1/1990 | Berke et al. | 351/50 |
| 4,934,806 A | 6/1990 | Berke et al. | 351/50 |
| 5,005,964 A | 4/1991 | Berke et al. | 351/50 |
| 5,048,943 A | 9/1991 | Allen | 351/50 |
| D327,079 S | 6/1992 | Allen | D16/102 |
| 5,381,263 A | 1/1995 | Nowak et al. | 359/411 |
| 5,446,507 A | 8/1995 | Chang | 351/158 |
| 5,521,654 A | * 5/1996 | Bertieri | 351/46 |
| 5,667,291 A | 9/1997 | Caplan et al. | 362/105 |
| 5,923,396 A | 7/1999 | Ulvio | 351/57 |

* cited by examiner

Primary Examiner—Georgia Epps
Assistant Examiner—Saeed Seyrafi
(74) Attorney, Agent, or Firm—Kathering McGuire (57) ABSTRACT

An eyewear loupe which is adaptable to various types of eyewear frame and provides a sub-area of magnification. The loupe is easily removed from an eyewear frame and reattached. The loupe can be worn on either side of an eyewear frame.

11 Claims, 7 Drawing Sheets

EYEWEAR MAGNIFYING LOUPE

BACKGROUND OF THE INVENTION

The present invention generally relates to an eyeglass loupe or a magnifying device which attaches to an eyewear frame. The device is particularly useful for people who wear eyeglasses but need the use of a magnifier and do not wish to use a hand held device.

There are various types of magnifiers available to the public. Magnifiers can be used for reading, craftwork, material inspection and the assembly of small parts.

Magnifying glasses in the form of additional lenses can be attached to eyewear frames. U.S. Pat. No. 5,923,396 (Ulvio) discloses supplemental lenses mounted on arms supported by a clip on the eyewear bridge. The supplemental lenses can comprise a bifocal or monofocal lens. U.S. Pat. No. 4,429,959 (Walters) discloses a pair of plastic plates which are hinged to the top of an eyeglass frame. One or both of the plates can accept a monocular. The hinge allows the plates and monoculars to be flipped up out of the way for normal viewing. U.S. Pat. No. 5,381,263 (Nowak et al); U.S. Pat. No. 5,446,507 (Chang) and U.S. Pat. No. 5,667,291 (Caplan et al) disclose magnification devices mounted or attached to the bridge of an eyewear frame. The magnification devices disclosed comprise telemicroscopic loupes and are binocular in nature.

U.S. Pat. No. 4,676,609 (Matsui) is another example of a supplemental lens attaching to an eyewear frame. The attachment means provides for an adjustable loupe frame which may be retracted.

It is important that a device which attaches to an eyewear frame be able to fit any type of frame. In the eyewear market, frames can be made from plastic, metal or combination thereof. The temples can be thick and durable or thin and fragile. Plastic is usually used to produce sturdy, heavier type frames while metal frames are usually lightweight. There can be a wide variety in the temple and frame front dimensions. Metal may be used to produce temples that are wire-like and circular in dimension. Plastic temples are more likely to be thicker and flatter than those made from metal.

Other types of attachments which may be used with eyewear include rear view mirrors. In many activities in which glasses are worn, a need arises to also provide a rear view capability for the wearer. Rear vision spectacles are of particular importance to bicyclists, joggers, motorcyclists, security guards, etc. Many of these types of spectacles have mirrors which attach to the frame or are integrally part of the eyewear.

U.S. Pat. No. 4,349,246 (Binner) discloses a rear view mirror that attaches to eyewear by means of a clip. The clip has spring loaded tongues which clamp onto the temple bar. Each tongue is slitted on its end so as to form fingers that grasp more efficiently around cylindrical surfaces such as when a temple bar is rounded. The mirror is positioned by means of a ball and socket joint.

U.S. Pat. No. 4,647,165 (Lewis) also discloses a clip on optical device for bicycle riders and the like. The optical device consists of a pair of prisms that are positioned in front of the lenses; a mirror attaches to one of the prisms.

U.S. Pat. No. 5,005,964 (Berke et al) discloses eyewear that has slender shafts which project out from the front portion of each temple. A rear vision element attaches to the end of each shaft. The rear vision elements are slideable and rotatable.

U.S. Pat. No. 4,896,956 (Berke et al) discloses a pair of single-pivot, rear vision elements. The elements attach to the frame inward of the frame front and temple hinges, bend around the outside of the hinge and fit against the temples. The inside surface of the portion which lies against the temple is covered with a reflective surface. In use, the elements rotate forward such that the reflective surface allows the user to view objects at the rear. U.S. Pat. No. 4,934,806 (Berke et al) discloses dual-pivot, rear vision elements with the temples and arms rotatably attached to the outer portions of the frame front. The rear vision elements are rotatably attached to the arms. The arms have two sections which pivot forward and outward to provide the wearer with a wide range of adjustment for viewing objects at the rear. In all Berke patents, the rear vision elements are non-detachable parts of the eyewear.

U.S. Pat. No. 4,733,958 (Gorsich) discloses a lateral vision reflector attached to the eyeglass frame adjacent to the user's nose. The reflective mirror has a coating applied to each of the opposite faces of the substrate. This reflector is of particular use to people with defects in their lateral visual fields.

U.S. Pat. No. D286,395 (Greenlaw et al) shows a rear view mirror which attaches to a temple by a three pronged attachment means. The rear view mirror can then be adjusted to view objects behind the user. U.S. Pat. No. 5,048,943 and D327,079 (both to Allen) also show a rear view mirror which pivots out from the temple. Upon storage, the mirror and arm retracts into the temple. In use, the arm pivots out and around toward the front, with the mirror being laterally adjustable to view objects. U.S. Pat. No. 4,798,454 (Hyun) also discloses a rear view mirror which extends from an eyewear temple. The temple has a channel from which a rod extends. The rod holds a rotatable mirror.

All of the above prior art represent permanent or semi-permanent attachment of magnifying devices to eyewear. None of the devices represent detachable devices which can be put on an eyewear frame or removed from a frame with relative ease.

Another issue for attaching a magnifying device is protection of the eyewear lenses. Any device that is attached and detached from eyewear must not scratch the lenses while being put on, removed or used.

Attaching a magnifying lens to an eyewear frame can provide the wearer with a magnified sub-area that can be used for precision work. Having the magnifying lens attached to an eyewear frame will free up the users' hands to manipulate various objects. The magnifying lens must not obscure and interfere with the field of vision.

SUMMARY OF THE INVENTION

An object of the present invention is to provide a magnifying loupe which may be used on either side of an eyewear frame, fit a wide range of eyewear frame styles, provide a sub-area of magnification for the user and be adjustable. The loupe may have one or two lenses and is comprised of a lens assembly, a pivotable boom and eyewear attachment means.

The present invention is adapted for cooperative use with an eyewear frame. As the magnifying lens is ideally suited for people who need to preserve their field of vision and yet have a smaller sub-area of magnification, the user is free to manipulate hand held work pieces or objects at all times. The magnifying loupe is easily adaptable to either side of the eyewear frame.

DETAILED DESCRIPTION OF THE INVENTION

Figure 1:
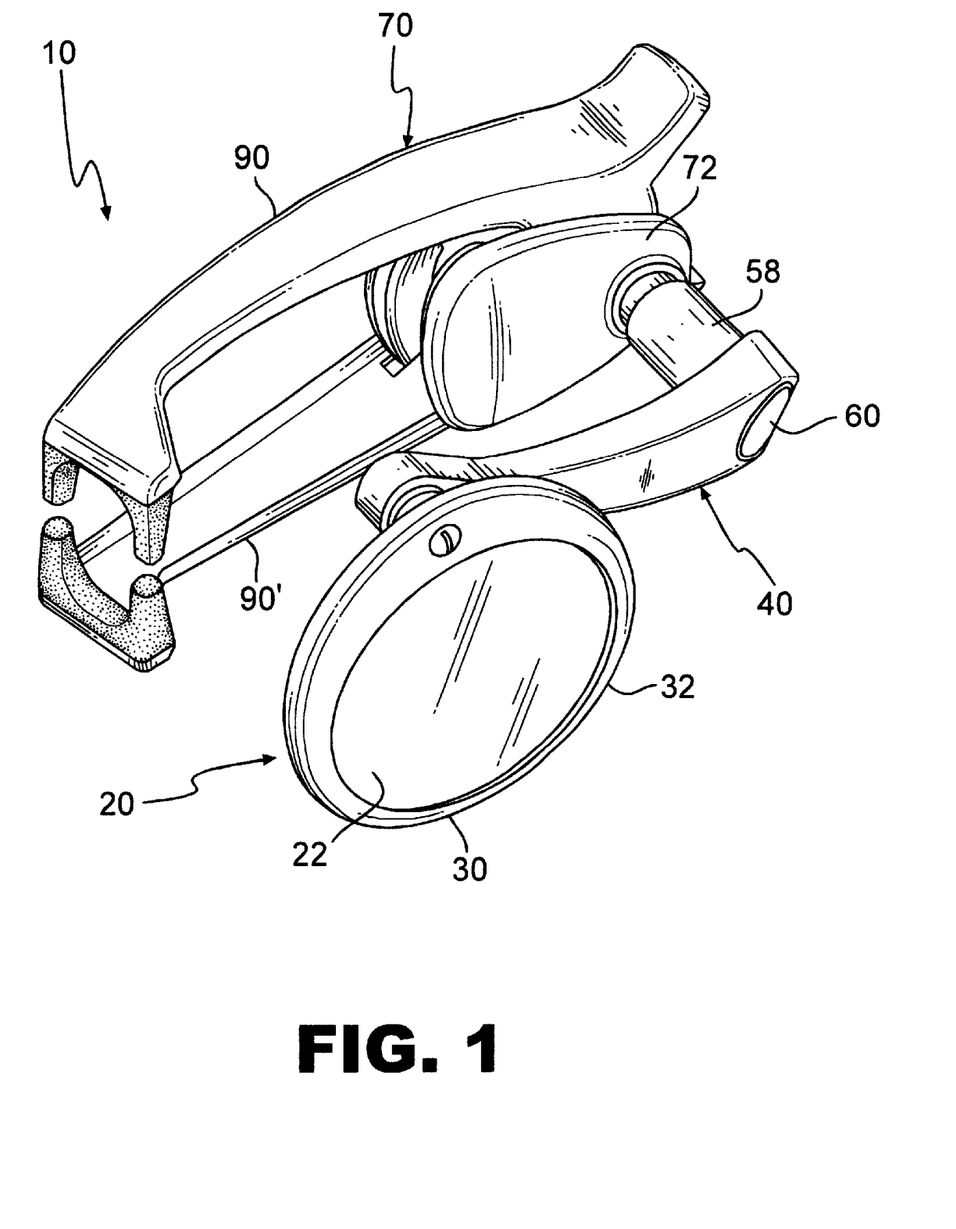
FIG. 1 is a front perspective view of the eyewear magnifying loupe.
Figure 2:
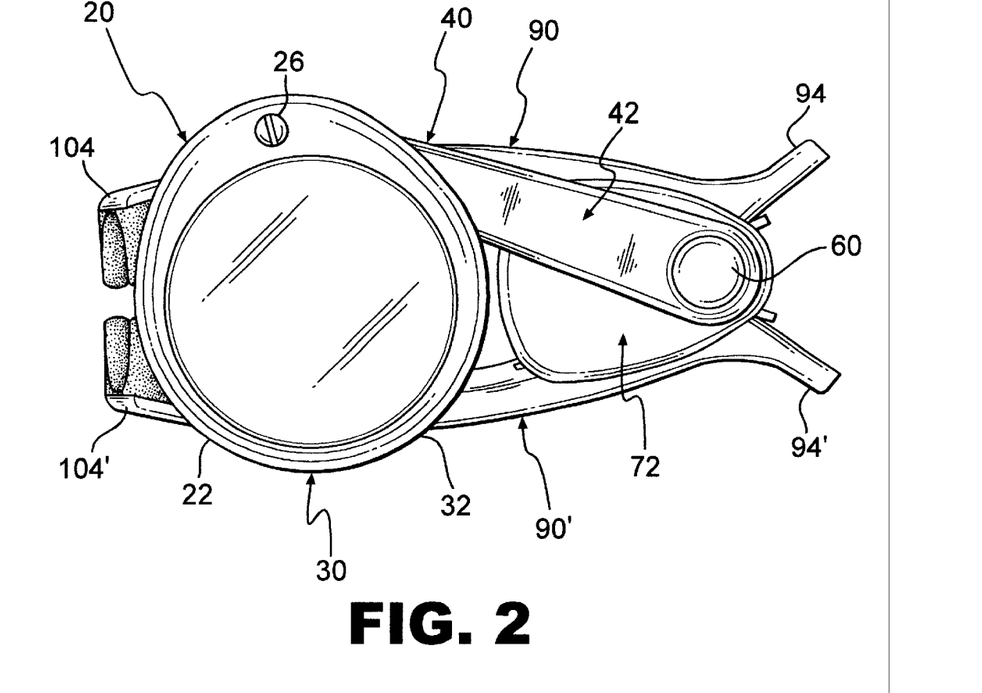
FIG. 2 is a front elevational view of the eyewear magnifying loupe.

FIG. 1 illustrates the eyewear magnifying loupe 10 from a front perspective view. The eyewear magnifying loupe 10 comprises three main parts: a lens assembly 20, a boom 40 and an attachment assembly 70 pivotally connected together by means which will be further described.

Figure 11:
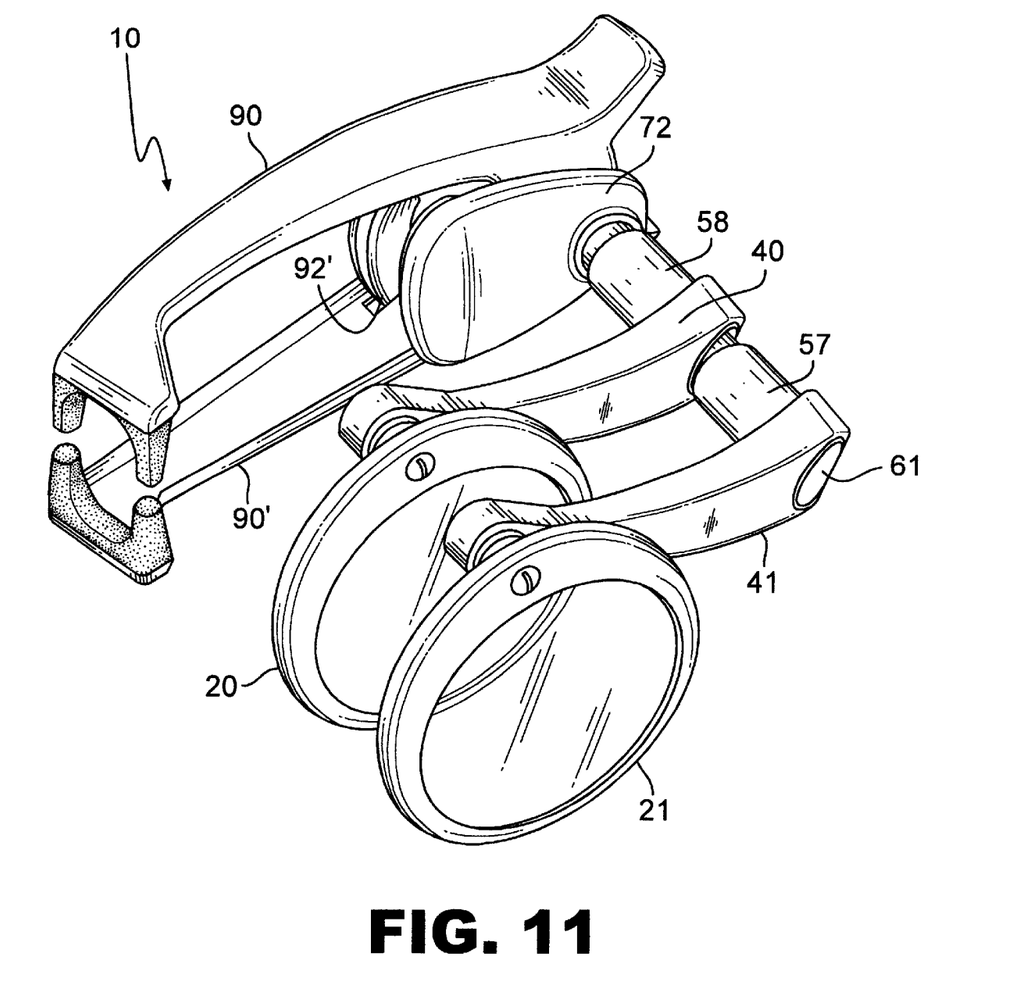
FIG. 11 is a front perspective view of an alternate embodiment in which the magnifying loupe has two lens assemblies and two booms.

Lens assembly 20 consists of lens 22 and lens frame 30. Lens frame 30, shown in more detail in FIG. 6, consists of first frame portion 32, second frame portion 34, first portion opening 38, second portion opening 38' and screw 26. First frame portion 32 and second frame portion 34 capture magnifying lens 22 about beveled edges 24, 24', the beveled edges being located on opposite surfaces of magnifying lens 22. On second frame portion 34 of lens frame 30 is washer 36 which can also be seen in FIG. 3. Washer 36 may or may not be an integral part of frame 30 and allows for unhindered pivoting of lens assembly 20 in relation to boom 40. As shown in FIG. 6, lens screw 26 extends through lens frame openings 38,38', washer 36, second end opening 52 and secures into lens frame bushing 39. Lens bushing 39 extends into second end opening 52 at rear surface 44 (shown in FIG. 5). Lens frame screw 26 serves to secure lens 22 between two lens frame portions 32 and 34 and to attach the lens assembly 20 to boom 40. In the preferred embodiment, lens 22 is a circular disk but may be other shapes. Lens 22 may be made of any optically clear material but is preferably made of glass. Single lens 22 can have any magnification power but is preferably 3×, 4×, 5× or 7× magnification. If the alternate embodiment of two lens assemblies are used (as shown in FIG. 11), the magnification power will increase but not double. For instance, combining two lens assemblies both having 4× magnification will give a total magnification of 7×. Two lens assemblies both having 3× magnification will produce 5× total magnification.

Figure 5:
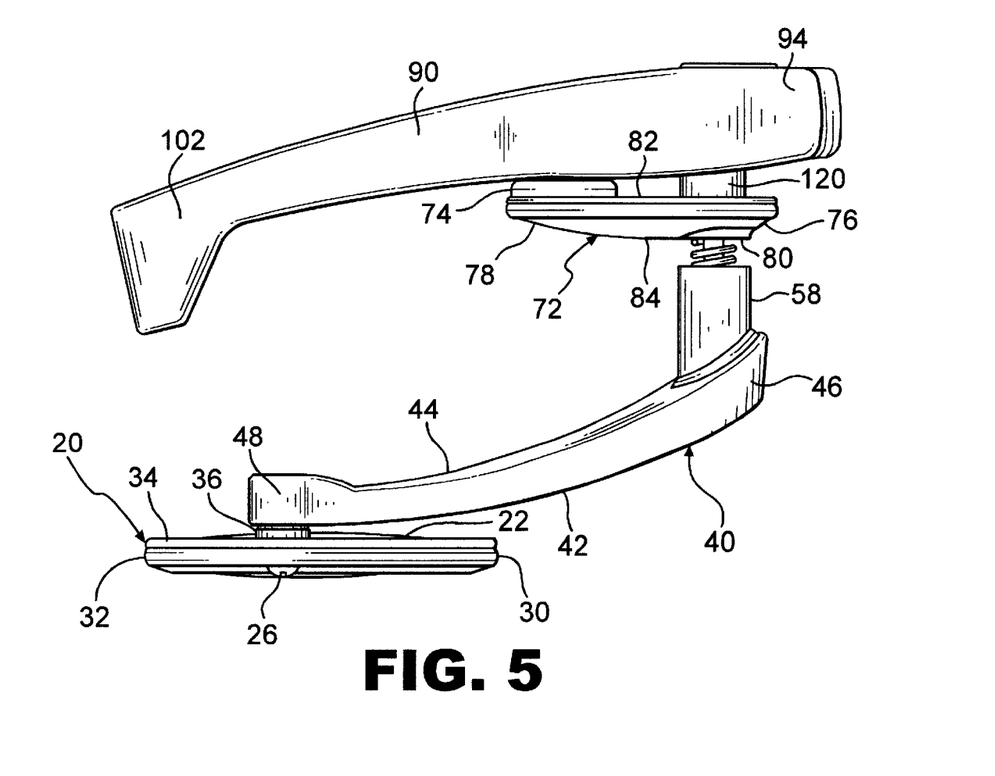
FIG. 5 is a top plan view of the eyewear magnifying loupe.
Figure 6:
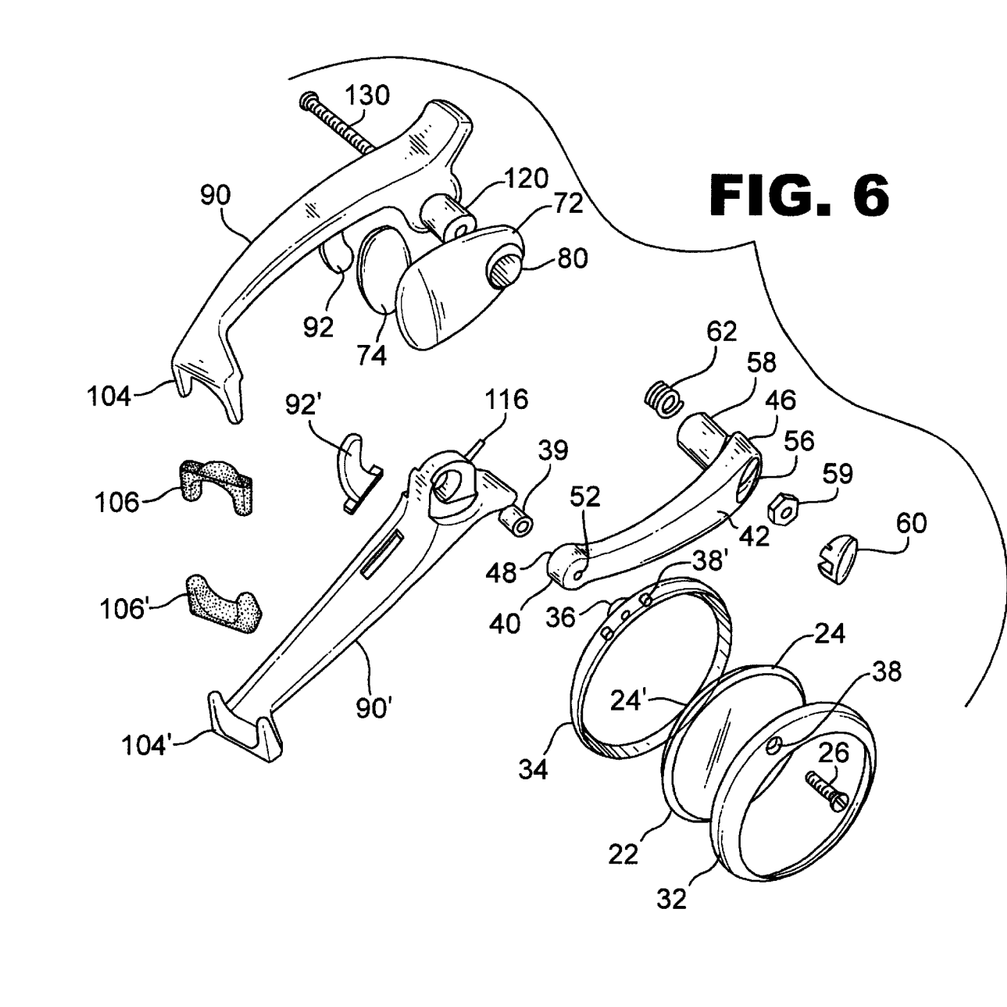
FIG. 6 is an exploded perspective view of the loupe.

Looking now at FIGS. 5 and 6, it can be seen that boom 40 has front surface 42, rear surface 44, and first and second opposite end portions 46, 48. First end portion 46 has first end opening 56 and second end portion 48 has second end opening 52. The diameter of second end opening 52 on front surface 42 is large enough to accommodate internally threaded screw 26. On rear surface 44, second end opening 52 must be larger to accommodate bushing 39. On first end portion 46, first end opening 56 is continuous throughout telescoping sleeve 58 which extends from rear surface 44. Inside front surface first end opening 56 is nut 59. Nut 59 secures single lens screw 130 which will be discussed later. Boom cap 60 fits into front surface first end opening 56, providing a smooth outer surface to the overall appearance of boom 40.

Figure 3:
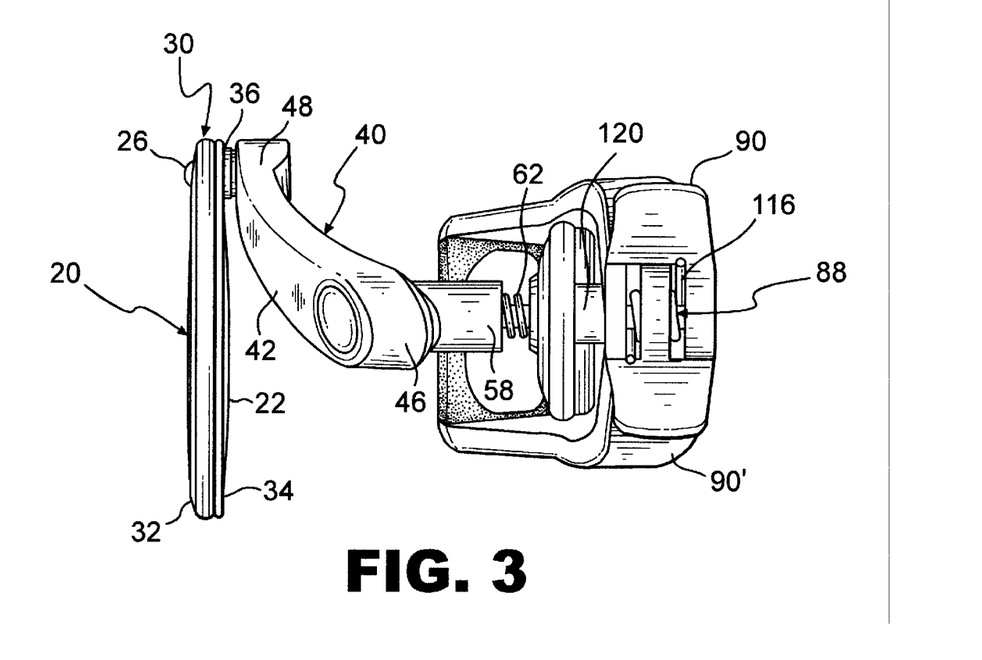
FIG. 3 is a right side elevational view of the eyewear magnifying loupe.
Figure 4:
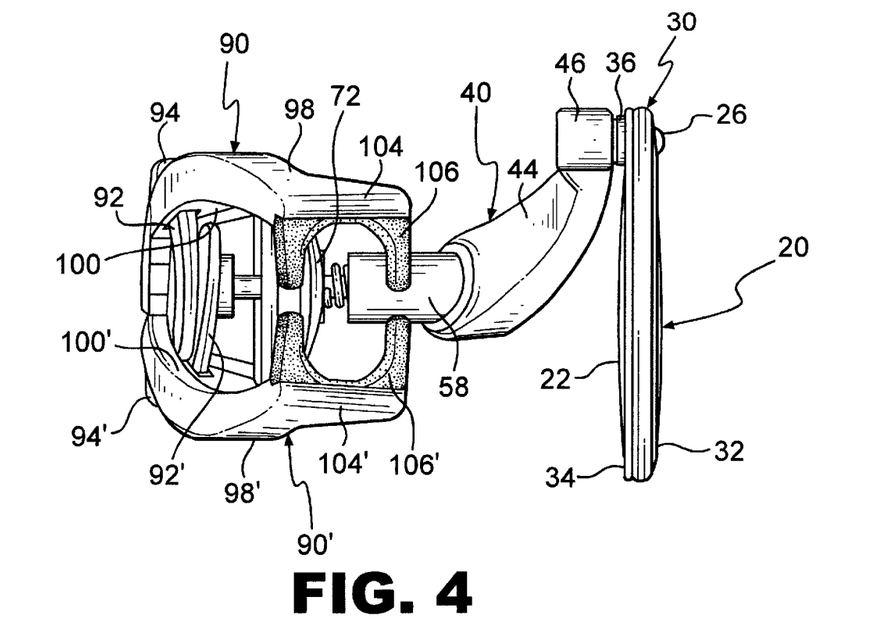
FIG. 4 is a left side elevational view of the eyewear magnifying loupe.
Figure 10:
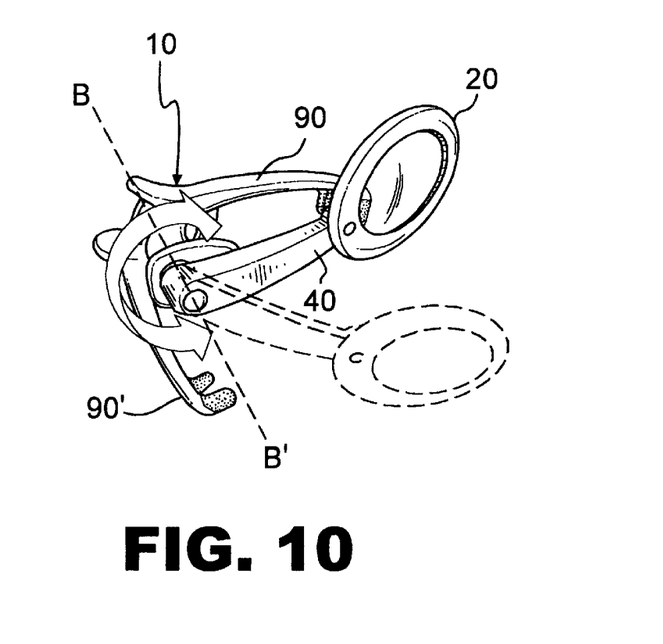
FIG. 10 is a front perspective view of the loupe, the boom and lens assembly in a central position shown in dotted lines, a solid arrow showing the movement of the boom and lens assembly from an upward position to a central position.

Boom 40 has a slight curve which is evident when viewed from top or side views FIG. 3, 4 and 5. The curve of boom 40, along with telescoping sleeve 58, also serves to maintain lens assembly 20 at a uniform distance to the user's line of sight. This curve of boom 40, along with telescoping sleeve 58, also allows for unhindered pivoting of boom 40 (and hence lens assembly 20) in front of an eyewear lens when magnifying loupe 10 is attached to an eyewear frame. This pivoting about axis BB' formed by single screw 130 is shown in FIG. 10. When not in use, boom 40 and lens assembly 20 can be raised up to above and out of the user's field of vision.

Turning to FIGS. 5 and 6, there can be seen in greater detail elements of the attachment assembly 70 which comprises puck 72, upper arm 90, lower arm 90' and hinge 88 (hinge 88 seen in FIG. 3). Puck 72 is used to brace magnifying loupe 10 against the eyewear when in use. Puck 72 has first portion 76, second portion 78, opening 80, inner surface 82 and outer surface 84. Opening 80 is internally threaded (not shown). While puck 72 may have any shape, in the preferred embodiment, second portion 78 has a wider, flatter shape than first portion 76. On inner surface 82 of the second portion 78 is puck pad 74. Puck pad 74 may be adhered to puck 72 or may be overmolded on puck 72. Puck pad 74 may be any soft rubber material that is non-abrasive and provides cushioning. It is important that puck pad 74 contact the eyewear frame and/or lens in order to allow the user to adjust the fit of magnifying loupe 10 to the eyewear frame. Puck pad 74 must not, however, scratch the lens or frame. Puck 72 screws onto telescoping sleeve 120 of upper arm 90, which will be described later.

As seen in FIGS. 1, 2, 4, and 6, upper arm 90 and lower arm 90' are similar to each other in many aspects of their construction. In the following discussion, only one arm will be discussed with the understanding that the other arm has the same corresponding parts, which are labeled in the Figures with a prime next to the identifying number. The differences between arms 90, 90' will be discussed in more detail later. Upper arm 90 has curved hook 92, first and second end portions 94, 96, upper surface 98, front surface 99 and lower surface 100. As evident in FIG. 2, first end portion 94 flares upward, providing a fingerpress for hinge 88, allowing the opening and closing of attachment assembly 70. Second end portion 96 has outer arm portion 102 which consists of a two prong-like structure 104. Attached to the two prong-like structure 104 is pad 106, which may be adhered to or overmolded on the arms. Pad 106 may be made from any soft material such as rubber. Outer arm portion 102 is used to grasp the eyewear frame front when the eyewear loupe is in use. By having pad 106 attached to the two prong-like structure 104, attachment assembly 70 can securely fit onto any size of eyewear frame front. Hook 92 is located on lower surface 100 and may be adhered to the surface or be part of the molded arm. When attaching the magnifying loupe 10 to an eyewear frame, hooks 92 and 92' of both arms 90, 90' must hook around the hinge of the eyewear.

Upper arm 90 and lower arm 90' differ in the following aspects: on the lower surface 100 of the first end portion 94 of upper arm 90, there are two inner arms 110, 110' which are spaced on opposite sides of arm 90 (only inner arm 110 is visible in FIG. 6). On the lower surface 100' of first end portion 94' of lower arm 90', there is only one inner arm 112 which has a more centered location. Inner arm 112 is threaded with tension spring 116. All three inner arms 110, 110' and 112 have a centered opening which align to form a continuous thoroughfare when inner arms 110 and 110' of upper arm 90 are placed directly over inner arm 112 of lower arm 90', forming hinge 88 (hinge 88 shown assembled in FIG. 3). By providing tension spring 116, arms 90, 90' are able to snugly grasp the eyewear frame front and stay attached. Additionally, upper arm 90 and lower arm 90' differ in that front surface 99 of upper arm 90 has telescoping sleeve 120, a portion which is externally threaded. Puck 72 screws onto telescoping sleeve 120 and can be adjusted to fit the eyewear frame front (puck pad 74 should contact the eyeglass frame or lens). When inner arms 110 and 110' of upper arm 90 are placed over and aligned with inner arm 112 of lower arm 90', single lens screw 130 can continue through the openings of the inner arms such that single screw 130 projects out from telescoping sleeve 120. This is shown in FIG. 6.

Attachment of boom 40 and attachment assembly 70 is accomplished by single lens screw 130. As previously stated, single lens screw 130 inserts through the openings of upper arm 110, inner arm 112 and upper arm 110' to project out through telescoping sleeve 120. Puck 72 has been attached by aligning the internally threaded opening 80 with the externally threaded sleeve 120. Compression spring 62 is slid onto lens screw 130. Lens screw 130 then screws into rear portion of first end opening 56 of boom telescoping sleeve 58. In the front portion of first end opening 56, nut 59 screws onto screw 130. The attachment of nut 59 and screw 130 is recessed into first end opening 56 such that boom cap 60 fits over first end opening 56. Compression spring 62 provides sufficient tension to maintain boom 40 in a position to be determined by the user.

As previously mentioned, by adjusting puck 72 so that puck pad 74 contacts the eyeglass lens, the magnifying loupe can be fitted to any type of eyewear frame. By turning puck 72 around single screw 130, puck 72 can be moved either closer or away from the eyewear lens. This ensures a secure fit, regardless of frame type or temple thickness.

The lens assembly/boom also may be rotated around lens screw 130 to move magnifying lens assembly 20 closer to or away from the user. Once the correct distance is obtained, compression spring 62 keeps lens assembly 20 in position.

Figure 7:
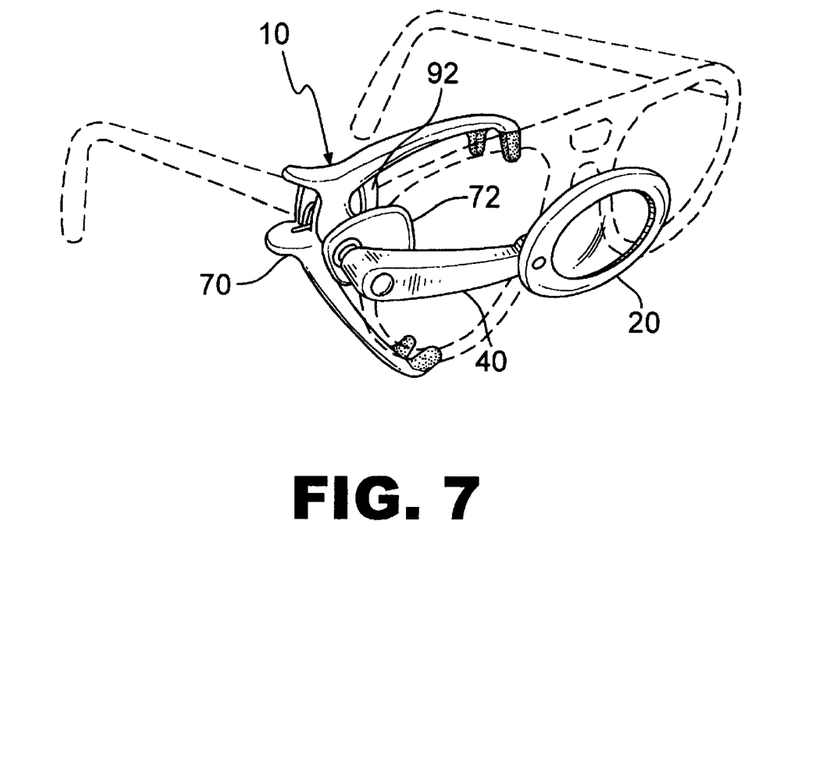
FIG. 7 is a front perspective view of the loupe attached to an eyewear frame, the eyewear frame shown in dotted lines.

FIG. 7 illustrates the placement of the magnifying loupe 10 on a pair of eyewear. Although shown attached on the right lens side of the eyewear, the magnifying loupe can easily be placed on the left lens side of the eyewear. This allows the user to switch magnifying loupe 10 to either side as his or her needs dictate. As shown, lens assembly 20 is centrally positioned to be in the user's line of sight.

Figure 8:
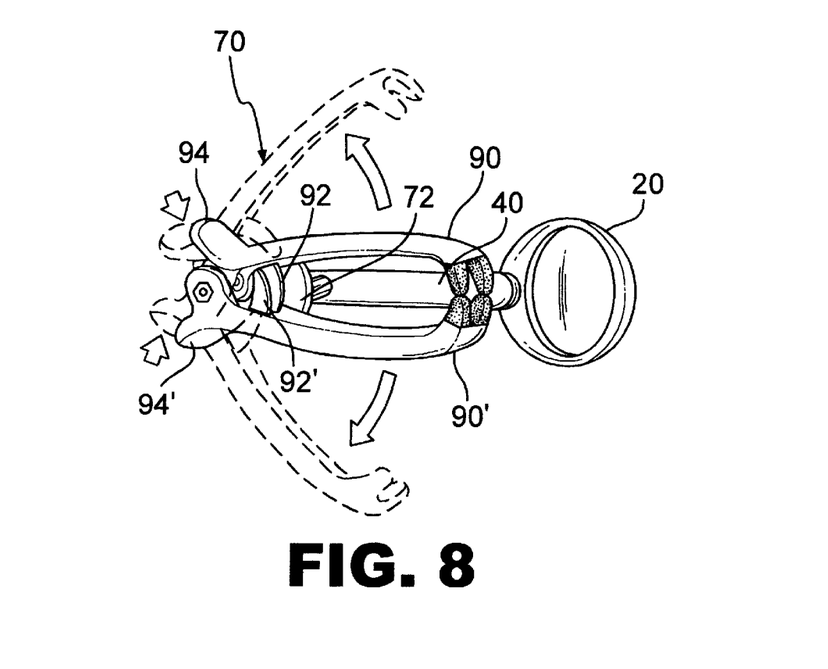
FIG. 8 is a rear perspective view of the loupe, the arms in an open position shown in dotted lines, solid arrows showing the movement of the arms from open position to closed position.

FIG. 8 further illustrates the movement of attachment assembly 70. By squeezing 94 and 94' together, arms 90, 90' are put in an open position and are ready to be placed on the front frame of an eyewear.

Figure 9:
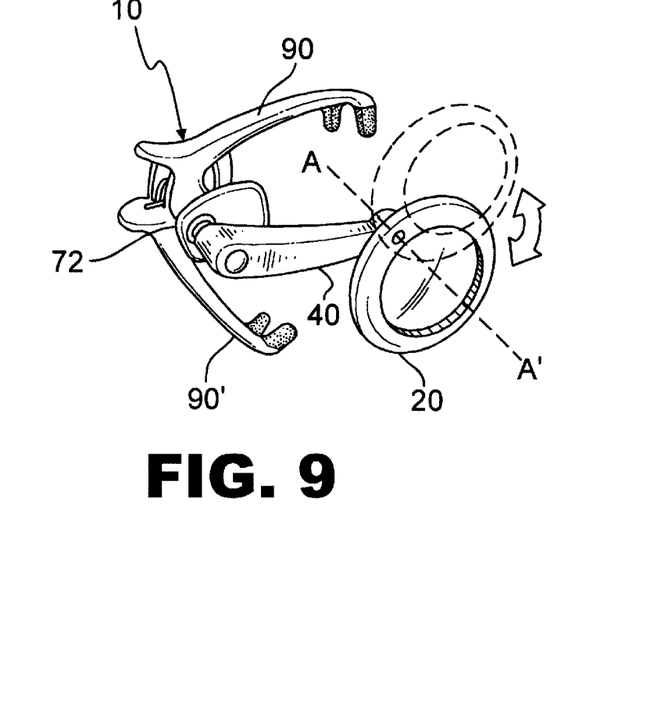
FIG. 9 is a front perspective view of the loupe, the lens in a central position shown in dotted lines, a solid arrow showing the movement of the lens from a central position to a downward position.

FIG. 9 shows the movement of lens assembly 20. The user can pivot lens assembly 20 about axis AA' formed by screw 26. This allows the user to place lens assembly 20 directly in the center of the user's viewing area or in the lower or upper viewing quadrants.

FIG. 10 shows the movement of boom 40 and lens assembly 20. Boom 40 pivots about an axis BB' formed by single screw 130. Boom 40 and lens assembly 20 can be raised up to above the viewer's line of sight.

FIG. 11 shows another embodiment wherein the magnifying loupe comprises two lens assemblies and two booms. FIG. 11 comprises all parts of FIG. 1 minus nut 59 and boom cap 60. Additionally, this embodiment includes lens assembly 21, boom 41 with telescoping sleeve 57 and boom cap 61. Single screw 130 has also been replaced with a longer screw and nut 59 has been replaced with nut 63 (not shown).

As previously stated, magnifying loupe 10 may be used on either side of an eyewear frame and may be adjusted to fit nearly any style frame, regardless of material used to make the frame. It allows for the user to have a visual area of normal, corrected vision and a sub-area of magnified vision.

We claim:

1. A device for magnifying an object, said device comprising:
   a) a magnifying lens assembly;
   b) a boom comprising a first end portion and a second end portion, said first end portion pivotally connected to said magnifying lens assembly; and
   c) attachment means comprising a pair of arms connected by a hinge such that said arms can removably attach onto an eyewear fame front, said hinge pivotally connected to said lateral end of said boom such that said lens assembly magnifies a portion of the user's vision.

2. The device of claim 1, wherein said lens assembly comprises a magnifying lens and a means for holding said lens.

3. The device of claim 2, wherein said means for holding said lens comprises an outer frame portion, an inner frame portion, outer portion opening, inner portion opening and a screw, wherein said lens is captured between said inner frame portion and outer frame portion and secured in place by extending said screw through outer portion opening and said inner portion opening.

4. The device of claim 1, said device comprising an upper arm, a lower arm, a puck having a internally threaded opening, an externally threaded telescoping sleeve on said upper arm wherein said puck is adjustably attached to said telescoping sleeve such that said magnifying device may securely be attached to an eyewear frame front by rotating said puck about said telescoping sleeve until said puck contacts said eyewear frame front.

5. The device of claim 4, wherein said upper arm has a lower surface and said lower arm has an upper surface, each arm having a hook, said upper arm hook located on said lower surface of said upper arm and said lower arm located on said upper surface of said lower arm, said hooks interacting to removably grasp an eyewear frame.

6. The device of claim 5, wherein said upper arm and said lower arms each have a first portion and a second portion, said first portion of each arm having two prongs, said prongs spaced so as to removably grasp an eyewear frame front.

7. The device of claim 1, wherein said lens assembly is pivotable about axis AA' between multiple selected positions from the user's line of sight to positions outside of the user's line of sight.

8. The device of claim 1, wherein said boom pivotally moves said lens assembly about axis BB' between multiple selected positions from the user's line of sight to positions outside of the user's line of sight.

9. The device of claim 1, further comprising a second lens assembly and a second boom, said second boom pivoting about axis BB' such that said lens assembly moves between multiple selected positions from the user's line of sight to positions outside the user's line of sight.

10. The device of claim 9, wherein said lens assembly is pivotable about axis AA' between multiple selected positions from the user's line of sight to positions outside of the user's line of sight.

11. The device of claim 1, wherein said arms comprise an upper arm and a lower arm, each arm having a fingerpress, said arms joined by a hinge, wherein depressing said fingerpresses toward each other causes said arms to open apart and permit attachment to an eyewear frame front.

* * * * *